United States Patent [19]

Balkus et al.

[11] Patent Number: 5,167,942
[45] Date of Patent: Dec. 1, 1992

[54] METHODS FOR THE PREPARATION OF MOLECULAR SIEVES, INCLUDING ZEOLITES, USING METAL CHELATE COMPLEXES

[75] Inventors: Kenneth J. Balkus, The Colony; Stanislaw Kowalak, Richardson, both of Tex.

[73] Assignee: Board of Regents, The University of Texas System, Austin, Tex.

[21] Appl. No.: 617,028

[22] Filed: Nov. 21, 1990

[51] Int. Cl.$^5$ ............................................. C01B 33/34
[52] U.S. Cl. ...................................... 423/705; 502/79; 423/DIG. 21
[58] Field of Search ............... 423/305, 306, 326, 328, 423/329, 330; 502/214, 79, 74, 75

[56] References Cited

U.S. PATENT DOCUMENTS

| | | | |
|---|---|---|---|
| 3,140,249 | 7/1964 | Plank et al. | 208/120 |
| 3,140,251 | 7/1964 | Plank et al. | 208/120 |
| 3,140,253 | 7/1964 | Plank et al. | 208/120 |
| 3,373,109 | 3/1968 | Frilette et al. | 423/328 |
| 3,674,709 | 7/1972 | Barrer et al. | 502/74 |
| 3,769,386 | 10/1973 | Rundell et al. | 423/328 |
| 3,941,871 | 3/1976 | Dwyer et al. | 423/326 |
| 4,199,478 | 4/1980 | Mantovani et al. | 502/75 |
| 4,243,828 | 1/1981 | Kerr et al. | 585/467 |
| 4,259,306 | 3/1981 | Pelrine | 423/325 |
| 4,295,993 | 10/1981 | Carlson | 208/206 |
| 4,310,440 | 1/1982 | Wilson et al. | 423/305 |
| 4,334,101 | 6/1982 | Mantovani et al. | 502/74 |
| 4,388,285 | 6/1983 | Rankel et al. | 423/329 |
| 4,440,871 | 4/1984 | Lok et al. | 502/214 |
| 4,500,503 | 2/1985 | Rankel et al. | 423/329 |
| 4,582,650 | 4/1986 | Felthouse | 502/74 |
| 4,943,545 | 7/1990 | Chang et al. | 502/56 |

FOREIGN PATENT DOCUMENTS

| | | | |
|---|---|---|---|
| 60-112612 | 6/1985 | Japan | 502/74 |
| 937748 | 9/1963 | United Kingdom | 502/74 |

OTHER PUBLICATIONS

Breck, D. W. in Zeolite Molecular Sieves, Robert E. Krieger Publishing Company, Malabar, Fla., 1974.
Denkewicz, R. P., "Zeolite Science: An Overview", J. Matrls. Ed. 9 (5), 1987.
Atlas of Zeolite Structure, W. M. Meier and D. H. Olson, Butterworth & Co., 1988.
Meyer et al., "Synthesis of Faujasite Supported Phthalocyanines of Cobalt, Nickel and Copper", Zeolites, vol. 4, pp. 30–34 (Jan. 1984).
Herron, "A Cobalt Oxygen Carrier in Zeolite Y. A Molecular Ship In a Bottle", Inorg. Chem., vol. 25, pp. 4714–4717 (1986).
Davis et al. in Zeolites: Facts, Figures, Future, Elsevier Science Publishers B.V., Amsterdam, pp. 199–214 (1989).
International Search Report, published in The Netherlands.

Primary Examiner—R. Bruce Breneman
Attorney, Agent, or Firm—Arnold, White & Durkee

[57] ABSTRACT

The present disclosure relates to improved methods for the preparation of aluminum phosphate molecular sieves and faujasite-type zeolites having stably encapsulated multidentate metal chelate complexes. This is achieved through direct incorporation of a selected multidentate chelate complex into the molecular sieve or zeolite reaction admixture prior to crystallization, allowing the admixture to react under conditions appropriate for the selected molecular sieve or zeolite, followed by preparation of the resultant molecular sieve-metal chelate complex in a highly crystalline form.

44 Claims, No Drawings

METHODS FOR THE PREPARATION OF MOLECULAR SIEVES, INCLUDING ZEOLITES, USING METAL CHELATE COMPLEXES

BACKGROUND OF THE INVENTION

1. Field of the Invention

This invention relates generally to novel methods of preparing crystalline molecular sieve materials, including FAU and LTH zeolites, as well as aluminum phosphate molecular sieves. By this improved method, novel molecular sieves are prepared having encapsulated multidentate metal chelate complexes which are incorporated internally of the sieve in a stable fashion.

2. Description of the Related Art

Molecular sieves of the crystalline zeolite type as well as the aluminum phosphate type are well known in the art and now comprise hundreds of species of both naturally occurring and synthetic compositions. In general, the crystalline zeolites are aluminosilicate frameworks based on an infinitely extending three-dimensional network of $SiO_4$ and $[AlO_4]^{-1}$ tetrahedra linked through common oxygen atoms. The framework structure encloses cavities occupied by large ions and water molecules, both of which have considerable freedom of movement, permitting ion exchange and reversible dehydration. The aluminum phosphate molecular sieves are similar structures comprised of $[AlO_4]^{-1}$ and $[PO_4]^{+1}$ tetrahedra linked through common oxygen atoms. Molecular sieves are attractive as interactive support materials because of their structural features and physical properties. These materials can provide shape selectively, ion exchange, acid-base sites, and large electrostatic fields.

In general, zeolites may be divided into ten different structural types depending on the structural building blocks. These groups include the analcime group, natorlite group, chabazite group, phillipsite group, heulandite group, mordenite group, faujasite group, laumontite group, pentasil group and the clathrate group. For an overview of zeolite science and the preparation of zeolite molecular sieves, one may wish to refer to Denkewicz R. P. (1987), "Zeolite Science: An Overview," from *Jrnl. Mater. Ed.*, 9(5) and Breck, D. W. (1984), *Zeolite Molecular Sieves*, R. E. Krieger Publishing Co., Malabar, Fl., both incorporated herein by reference. In terms of zeolites, however the present invention is concerned with the faujasite group and LTA structures zeolites which include principally the X, Y, and. These zeolites are distinguished from other types of zeolites and from each other on the basis of their silica-to-alumina ratio, on the basis of their basic building block structures, as well as on the basis of their physical and chemical properties, etc. The distinction between zeolites of the faujasite group and those of other groups are well known to those of skill in the art as exemplified by the review references discussed above, and include frameworks based on polyhedral cages of cubic or near cubic symmetry.

Molecular sieves which are not zeolitic in nature, i.e., contain framework constituents other than or in addition to Si and Al, but which do exhibit the ion exchange and/or adsorption characteristics of the zeolites, are also known. For example, metallorganosilicates which are said to possess ion-exchange properties, have uniform pores and are capable of reversibly absorbing molecules, are reported in U.S. Pat. No. 3,941,871, issued Mar. 2, 1976, to Dwyer et al. Furthermore, molecular sieve materials having a microporous 3-dimensional crystalline aluminophosphate phase and said to have uniform pore dimensions, are described in U.S. Pat. No. 4,310,440, issued Jan. 12, 1982, to Wilson et al.

An important aspect of molecular sieve chemistry is an ability to modify their structure to incorporate metal chelates, which serves to modify their physical properties, and, hence, their utility. The modification of zeolites can take a variety of forms ranging from simple ion exchange to the encapsulation of large metal clusters. The term "ship-in-a-bottle" complex has been used to describe encapsulated complexes that are too large to escape through the sieve pores. Such complexes can be viewed as a bridge between homogenous and heterogenous systems since neutral complexes would be free to move within the confines of the sieve's cavities but still be trapped within the solid support.

Three different methods have been described for encapsulating a metal complex within certain types of zeolites. Two approaches which have been extensively studied include the flexible ligand and template synthesis approach. The flexible ligand approach, described, e.g., by Herron, N. (1986), *Inorg. Chem.*, 25:4714, involves employing a ligand that when uncomplexed can easily diffuse into the zeolite but once complexed to a metal ion, becomes too large to exit. In contrast, the template synthesis approach, described, e.g., by Meyers et al. (1984), *Zeolites*, 4:30, involves constructing a large chelate ligand inside the cage from ligand precursors that are small enough to diffuse into the cavity. Lastly, the zeolite synthesis approach described in the present disclosure, the zeolite or molecular sieve is actually synthesized around the metal complex.

While the flexible ligand approach provides certain advantages, including entrapment and site isolation of metal complexes, it is also beset by many problems and disadvantages. Most importantly, the type of metal chelate which one employs must be selected such that in its uncomplexed state it includes a flexible ligand of a shape which can diffuse through openings into the interior of the zeolite, and, after complexing, must have a changed shape such that the complexed ligand cannot exit the interior of the molecular sieve. Additional problems with the flexible ligand approach include incomplete complexation of exchanged metal ions and partial coordination of the ligand.

The template synthesis approach also has certain associated advantages and disadvantages. For example, while this approach has the advantage of entrapment and site isolation of metal complexes, it has the severe disadvantage in that one is quite limited in terms of the type of chelate which can be successfully synthesized within the interior of the zeolite or molecular sieve.

The disadvantages of the template synthesis approach can be appreciated when one considers the encapsulation of metallophthalocyanines (MPc). This has been accomplished in X and Y type zeolites using a template synthesis, and generally involves the diffusion of four dicyanobenzene molecules into the supercage where they condense around a metal ion that was previously exchanged into the zeolite. Problems with this method arise because the synthesis requires temperatures of 150°–400° C. which may result in the reduction of certain metal ions. Additionally, a percentage of the exchanged metal ions may remain uncomplexed.

A third approach which has been attempted in only certain limited circumstances, termed the zeolite synthesis approach, involves the synthesis of a zeolite around the metal chelate complex. While the zeolite synthesis approach could offer certain advantages, its use has only been reported in quite limited circumstances. Moreover, the results to date have been somewhat disappointing. For example, U.S. Pat. No. 4,388,285 to Rankel, et al. discloses the use of a series of transition metal complexes as templates for the synthesis of ZSM-5-type zeolites. This process is carried out by mixing a suitable source of silica, a source of alumina, a source of alkali metal, and at least one transition metal complex. These materials are then reacted at temperatures and under conditions appropriate for the formation of a ZSM-5-type zeolite, followed by crystallization of the resultant zeolite therefrom. Unfortunately, the resultant material was found to be either amorphous (i.e., noncrystalline), or exhibited crystalline purity of on the order of only 5%-50%. Moreover, it does not appear as though the metal chelate was actually encapsulated into the ZSM-5-type zeolite in that although the patent indicates that these complexes were stable to washing by solvent extraction, the present inventor has found that ZSM-5 zeolites incorporating copper phthalocyanine prepared by the method of this patent are not stable to sublimation.

A related patent, U.S. Pat. No. 4,500,503 also to Rankel, et al., discloses what appears to be similar process, but is limited to the preparation of a mordenite-type zeolite. As with the '285 patent, the mordenite which was prepared was either amorphous or had a crystalline purity of only 15-40%. Furthermore, as with the '285 patent, this disclosure is limited to the use of only a few types of metal chelate complexes.

Accordingly, there remain a variety of disadvantages associated with the preparation of zeolites which have metal chelate complexes incorporated within their interior cavity. Foremost among these disadvantages are restrictions upon the types of metal chelates which may be successfully employed. The ability to provide zeolites encapsulating a wide range of possible metal chelate complexes is particularly important where one desires to prepare molecular sieves having a wide range of potential application. Additionally, the types of molecular sieves which contain encapsulated metal complexes have heretofore been limited to molecular sieves of the ZSM-5 and mordenite-type zeolite, and these preparations have themselves been of questionable purity. Accordingly, there is a need for new methods for preparing molecular sieves having encapsulated metal complexes.

SUMMARY OF THE INVENTION

The present invention addresses one or more of the foregoing or other disadvantages by providing a generally applicable method for preparing highly crystalline molecular sieves of the aluminum phosphate type, as well as zeolites of the faujasite group. It is believed that through the application of the general techniques disclosed herein, one will be enabled to prepare molecular sieves of the foregoing types having a very wide range of stably encapsulated multidentate metal chelate complexes, and having very high degree of purity and crystallization.

In general, the preparation of crystalline zeolites of the faujasite group having an encapsulated multidentate metal chelate complex includes first preparing an aqueous alkaline admixture of aluminate and silicate anions and an alkaline or alkaline earth oxide, these materials being the admixture introduced into molar ratios and at pH appropriate for the formation of zeolite of the faujasite group. The reaction admixture will further include a desired multidentate metal chelate complex. As used herein, the term "multidentate metal chelate complex" is intended to refer to any metal chelate complex which incorporates a transition metal, rare earth element, alkali or alkaline earth metal into a multidentate hydrocarbon structure having electron donor groups available for chelating a selected metal ion. The term "multidentate" is intended to exclude bidentate chelates, in that the use of bidentate compounds has been found to result in the generation of principally amorphous as opposed to crystalline materials.

The multidentate metal complexes of the present invention are typically larger than the pore size of the encapsulating faujasite zeolite. Faujasite zeolite structures have a nominal pore size on the order of about 8 Å (Breck, 1974), while multidentate metal complexes of the present invention are sufficiently large to prevent egress from the zeolite cage, resulting in zeolite entrapped metal complexes analogous to the "ship in a bottle" structure.

Typically the multidentate chelate ligand of the multidentate metal chelate complex will include either a polyazo, polyphosphoro, polysulfur, polyethermacrocycle, or a heteronuclear chelate macrocycle comprising one or more of these groups. Particularly preferred for the chelate ligand are polyazo macrocycles and, even more particularly, tetraazo macrocycles. The azo-based compounds are preferred because of their stronger ligand field effects.

Depending on whether one desires to prepare an FAU or LTA type zeolite, the aqueous alkaline admixture will comprise a molar ratio of aluminate/silicate/water in a range of about 1/1-14/17-excess respectively, at a pH from about 11 to 14. Where an FAU type zeolite is to be prepared, the aqueous alkaline admixture will generally include a molar ratio of aluminate/silicate/water in the range of about 1/1-10/50-160, respectively. Moreover, where FAU type zeolite is to be prepared, the admixture will typically be reacted at between about 20° and 175° C., for between about 2 and 144 hours. Importantly, the inventor has found that this admixture may be reacted under these conditions and an approximately 100% crystallization achieved.

Where an LTA type zeolite is to be prepared, the aqueous alkaline admixture will generally comprise a molar ratio of aluminate/silicate/water in the range of about 1/1-3/17-100, respectively, and, preferably, reacted at between about 20° and 175° C. for between about 2 and 144 hours. As with FAU type zeolites, the inventor has found that this admixture may be reacted until crystallization is essentially complete, thus allowing one to prepare essentially 100% pure crystalline type A zeolites.

Crystalline aluminum phosphate molecular sieves which include an encapsulated multidentate metal chelate complex may be prepared in a similar fashion by first preparing an aqueous acidic admixture of aluminate and phosphate anions in molar ratios appropriate for the formation of an aluminum phosphate molecular sieve, and introducing a multidentate metal chelate complex into the admixture prior to crystallization. In connection with the preparation of aluminum phosphate molecular sieves, one may employ the same wide range of multidentate metal chelate complexes as was employed in connection with the preparation of the faujasite-type zeolites, for encapsulation.

After the admixture is formed, it is reacted under conditions appropriate for the formation and crystallization of an aluminum phosphate molecular sieve and, following reaction, molecular sieve crystals having an encapsulated metal chelate are prepared therefrom. Typically, the aqueous admixture will comprise a molar ratio of aluminates-phosphorous in a range of about 1/1. Furthermore, for the preparation of aluminum phosphate molecular sieves, one will desire to react the admixture at between about 125° and 200° C. for between about 5 and about 150 hours. As with the faujasite-type zeolites, aluminum-phosphate molecular sieves prepared in the foregoing manner may be reacted until crystallization is essentially complete, allowing the preparing of essentially pure molecular sieve crystals.

In the practice of this invention, it is contemplated that the central metal ion may be virtually any transition metal, rare-earth metal, alkali or alkaline earth metal. However, preferred metal ions include $Co^{2+}$, $Fe^{2+}$, $Ni^{2+}$, $Cu^{2+}$, $Mn^{2+}$, $Pd^{2+}$ and $Gd^{3+}$ ions, and the like.

Additionally, one may desire to employ a directing agent in the admixture prior to reacting. A directing agent is an agent which modifies the admixture gel and/or provides a template for crystal formation. Exemplary directing agents include FAU and LTH tetrabutylammonium hydroxide, tetrapropyl ammonium hydroxide, pyrrolidine, alkyl ammonium salts and neutral amines. Particularly preferred directing agents include tripropylamine, n-dipropylamine, and tetraethylammonium hydroxide.

In preferred embodiments involving the preparation of aluminum phosphate molecular sieves, the aluminate may be introduced into the admixture in the form of an aluminum alkoxide, and the phosphorus introduced in the form of phosphoric acid. However, the invention is certainly not limited to these embodiments and those of skill in the art will appreciate the numerous other sources of aluminum and phosphate may be successfully employed including, but not limited to, boehmite, pseudoboehmite, alumina, phosphorous pentoxide, and the like.

For the preparation of faujasite-group zeolites, the aluminate is preferably introduced into the admixture in the form of aluminum isopropoxide, and the silicate introduced in the form of silica gel. However, the invention is not limited to these particular embodiments and those of skill in the art will appreciate the numerous other sources of alumina and silica may be successfully employed including, but not limited to, alumina, aluminum hydroxide, silicic acid and even clays.

Furthermore, in the context of zeolites, one will desire to employ an alkaline or alkaline earth hydroxide, in order to adjust the pH and to provide a charge balance cation. Preferred alkali or alkaline earth oxides include NaOH, KOH and $Ca(OH)_2$.

The final step of the processes of the present invention, whether one prepares an aluminum phosphate-type molecular sieve or a faujasite-group zeolite, is to prepare the crystalline material from the reaction admixture. This typically involves treating the admixture to remove impurities or unreacted materials. One method for removing impurities or unreacted materials is to simply wash the reaction admixture with an aqueous wash such as water. However, the admixture may additionally or alternatively be washed with a selected solvent such as pyridine, acetone, methylene chloride or dimethylformamide. Furthermore, one may treat the reacted admixture by sublimation in order to remove volatile materials such as non-encapsulated metal complexes or templates from the surface of the molecular sieve or zeolite.

An important advantage to the present invention is the recognition by the inventor that aluminum phosphate molecular sieves and faujasite-group zeolites may be prepared in the foregoing fashion to a very high degree of both product purity and crystalline purity. That is, the product which is achieved will typically be at least 80% crystalline and, more typically, up to essentially 100% crystalline. Furthermore, using the techniques disclosed herein, one will typically achieve a faujasite-group zeolite or aluminum phosphate molecular sieve having a very high degree of purity, for example, on the order of 80–100% pure, as measured by X-ray powder diffraction.

In that through the practice of the present invention one will be enabled to employ numerous metal chelate ligands which could heretofore not be employed for the preparation of zeolites or aluminum phosphate molecular sieves, the invention is further directed in certain embodiments to the faujasite-type zeolites and aluminum phosphate molecular sieves themselves.

DESCRIPTION OF THE PREFERRED EMBODIMENTS

The present invention embodies the realization by the present inventor that one may successfully prepare highly purified and highly crystalline aluminum phosphate-type molecular sieves and faujasite-group zeolites by directly incorporating a selected metal chelate into the reaction admixture. By directly incorporating the metal chelate ligand into the reaction admixture, crystallization is facilitated and allows the introduction of the intact metal complex into a much greater percentage of the zeolite crystals than has been heretofore possible. Moreover, the resultant molecular sieve complexes are more stable, better defined and can incorporate a wider variety of ligands in complex with a wider variety of metal ions than has been heretofore possible. This allows for the possibility of preparing entirely new types of zeolites with entirely new types of incorporated metal chelate ligands.

The preparation of molecular sieves of the aluminum phosphate type is achieved using a pressurized atmosphere such as can be generated in an autoclave. Through this approach, and employing the concept of direct incorporation of the metal chelate complex into the reaction mixture, the inventor has prepared for the first time chelate complexes encapsulated in aluminophosphates such as AlPO-5 (see below) and AlPO-11.

A framework projection [001] of AlPO-5 is as follows:

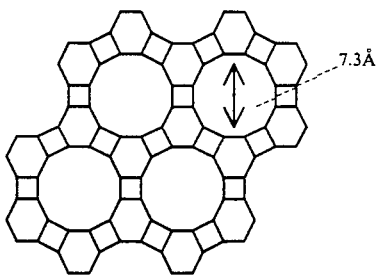

The straight channels of AlPO-5 which lack restricted apertures would seem unsuited for the ship-in-a-bottle complexes which have been prepared with faujasite-type zeolites. Therefore, the ability to prepare aluminum phosphate sieves having stably encapsulated metal chelates is somewhat surprising. The inventor has prepared a variety of complexes, such as phthalocyanine complexes, encapsulated in aluminophosphate molecular sieves that cannot be removed by solvent extraction or sublimation. Where, for example, phthalocyanine metal complexes are employed, the size of these complexes exceeds the pore diameter such that the phthalocyanine ring must be distorted and/or there must be structural defects developed during crystallization which allow the accommodation of these complexes. It is possible that a new type of molecular sieve is being generated.

This approach has also resulted in several new porous phases which are currently undergoing structural characterization. For example, using NiSALEN (bis(salicylaldehyde)ethylenediimine) in a recipe for the AlPO-5 molecular sieve, a porous crystalline material having x-ray diffraction pattern different from any AlPO$_4$ structure previously observed by the inventor. In these studies, NiSALEN was combined with aluminumisopropoxide, phosphorous pentoxide, tripropylamine (TPA) and water in a molar ratio of Ni:Al:P:TPA:H$_2$O of 0.008:1:1:0.5:19 with an additional 5 mL of dimethylformamide used to dissolve the complex. The mixture was crystallized at 150° C. for 24 hours. The XRD patter for the highly crystalline product was unlike that previously reported for any aluminum phosphate.

| D | I | D | I | D | I |
|---|---|---|---|---|---|
| 3.847 | 100 | 4.347 | 27 | 4.166 | 22 |
| 3.354 | 46 | 8.595 | 26 | 7.232 | 21 |
| 3.357 | 44 | 2.706 | 26 | 3.742 | 20 |
| 3.142 | 40 | 6.107 | 24 | 3.211 | 20 |
| 5.564 | 31 | 2.667 | 24 | 3.310 | 19 |
| 5.950 | 28 | 3.637 | 23 | 2.390 | 18 |

In general, molecular sieve syntheses have been conducted in water. Therefore, it was anticipated that the metal chelate would have to be water soluble in order to affect the crystallization and become encapsulated. In the case of neutral phthalocyanine complexes which are generally water insoluble it was initially thought that the complex should first be dissolved in a small amount of organic solvent such as pyridine then transferred to the crystallization mixture. Although FAU zeolites containing complexes were successfully crystallized using this strategy there is the possibility that the organic solvent might exert a template effect. It was very surprising that in the absence of organic solvent, X zeolites containing metal phthalocyanines could be prepared using the techniques of the present invention. This indicates that water solubility is not a prerequisite for the inclusion of a metal chelate in this invention nor is the prior solubilization of water insoluble complexes in organics before addition to the crystallization mixture. Therefore, many different types of metal chelate complexes might be employed.

It is proposed that virtually any multidentate metal chelate complex may be employed in the practice of the invention, wherein multidentate is defined to include only those metal chelate ligands having more than two electron donor sites (i.e., greater than bidentate). The basis for the requirement that the metal chelate complex have more than two donor sites is unclear, it is based on the inventor's observation that metal complexes of certain bidentate ligands such as 1, 2-diaminoethane result in the production of essentially amorphous material as opposed to crystalline material. Further, it should be noted that certain metal chelate ligands will be preferred for the preparation of certain types of faujasites zeolites. For example, using a typical recipe for an X-type zeolite incorporating one of the following macrocyclic complexes will result in the generation of fairly large crystals (>10 μm) of the FAU type.

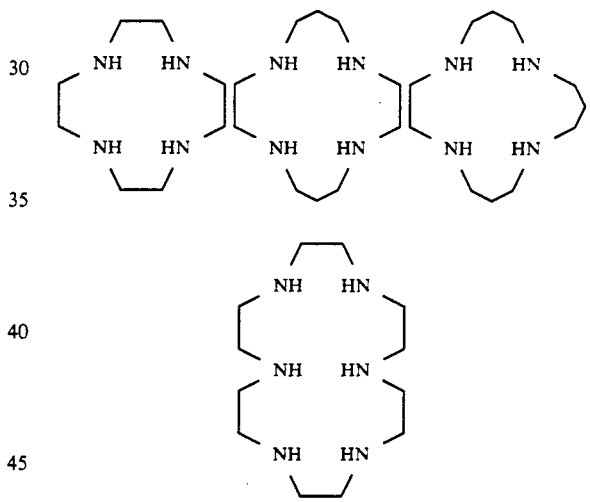

However, LTA type zeolites are typically prepared with the 1,3-bis (2-pyridylimino) isoindoline (BPI) complexes such as the following:

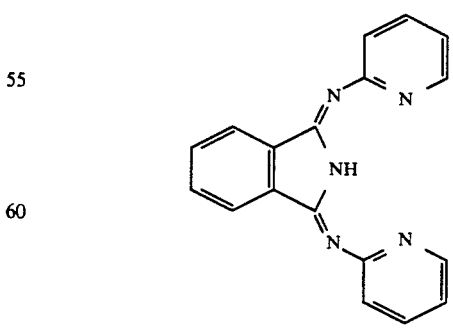

Preferred multidentate chelate ligands will generally be polyazo macrocycles, and more particularly, tetraazo macrocycles, in that these ligands provide strong ligand fields and thermodynamic stability. However, the invention is by no means limited to the polyazo macrocycles and is intended to include polyphosphoro, polysulfur, polyether macrocycles such as crown ethers, or even a heteronuclear chelate macrocycle which includes one or more of these moieties.

Exemplary multidentate metal chelate complexes which may be employed in connection with the present invention include the following:

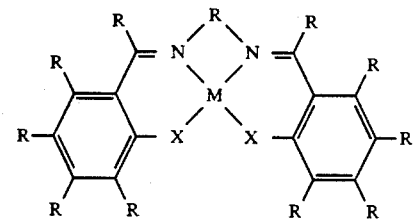

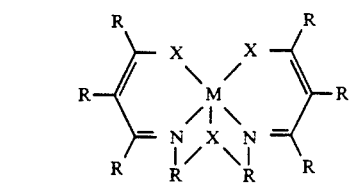

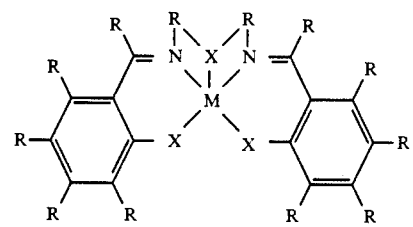

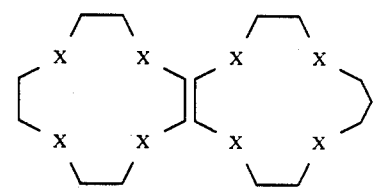

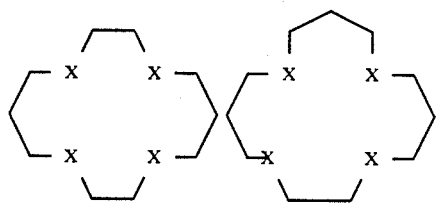

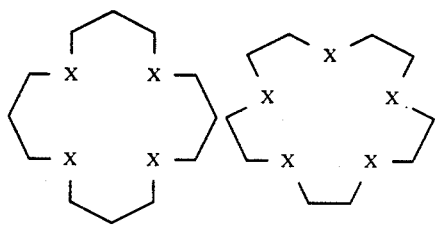

-continued

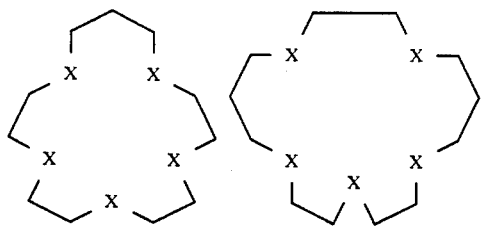

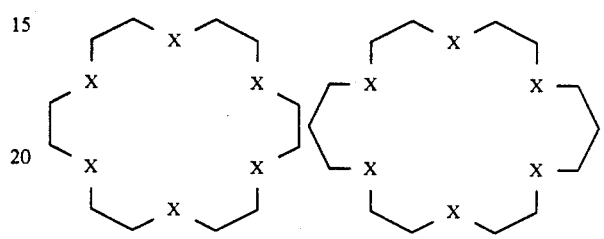

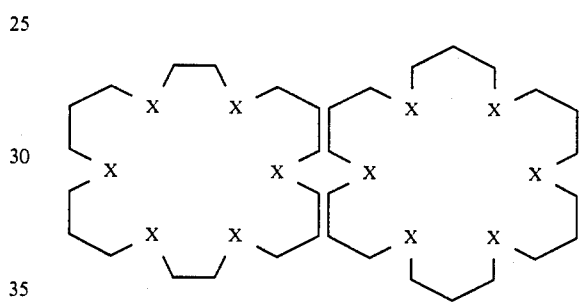

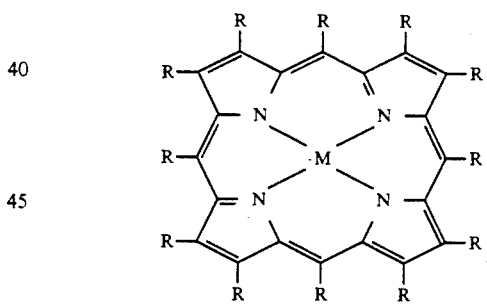

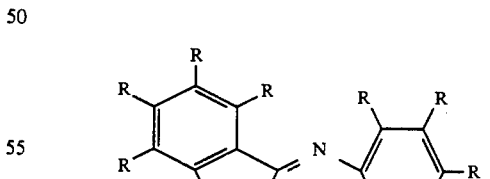

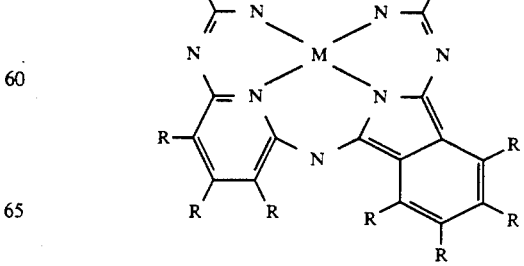

-continued
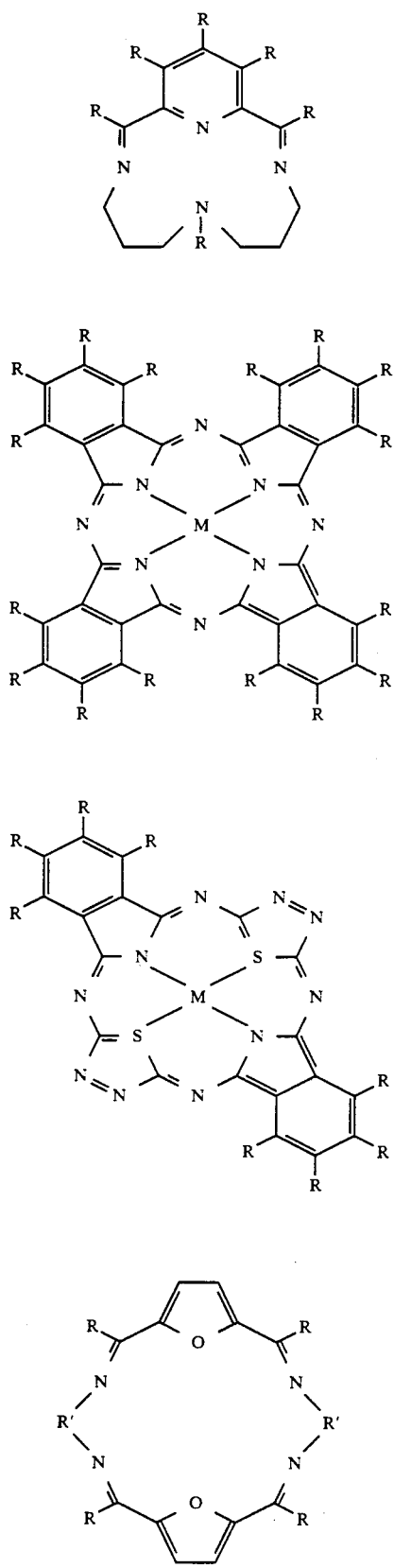
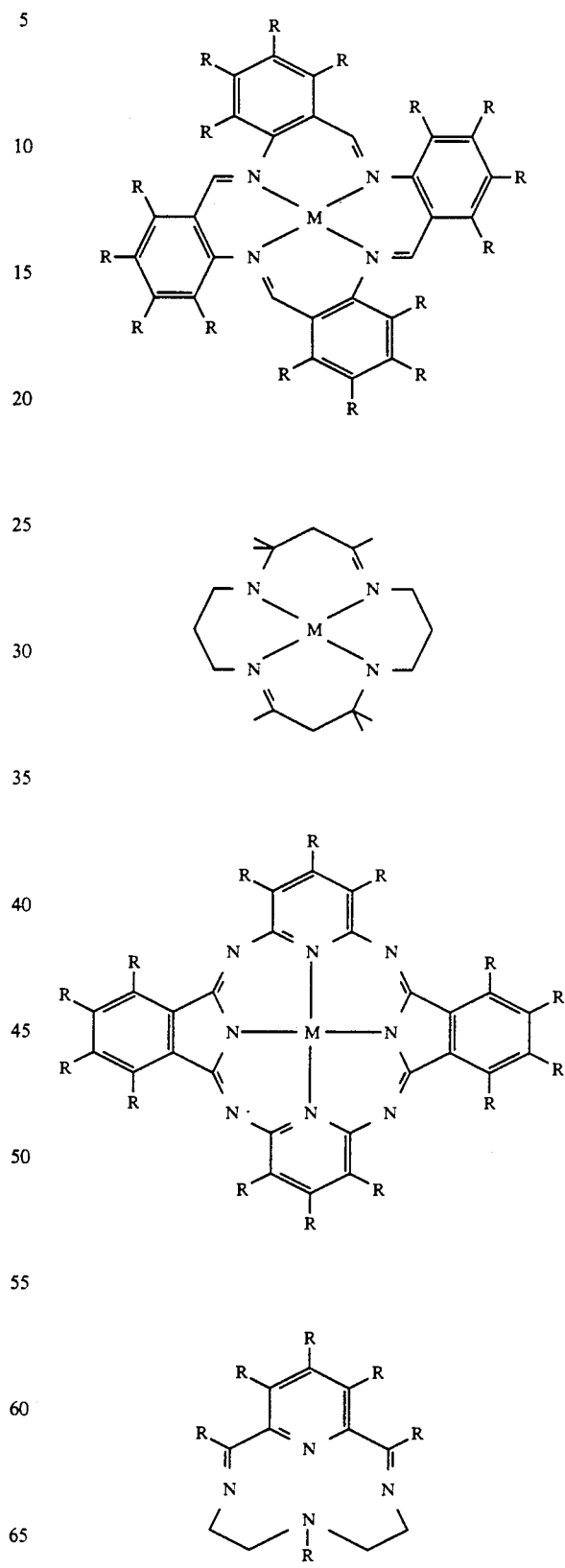

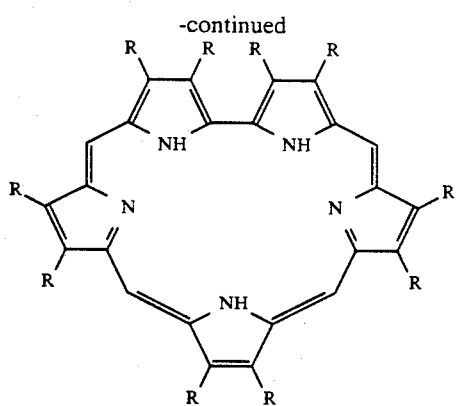
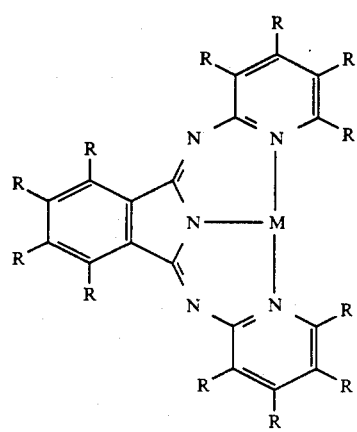
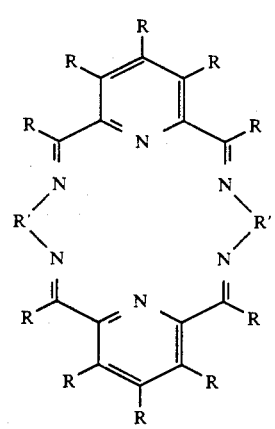
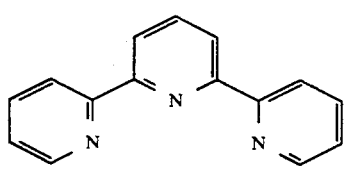
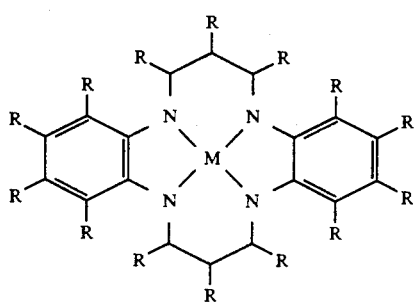

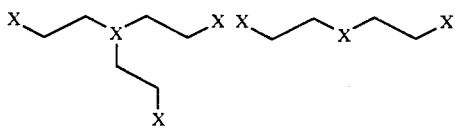
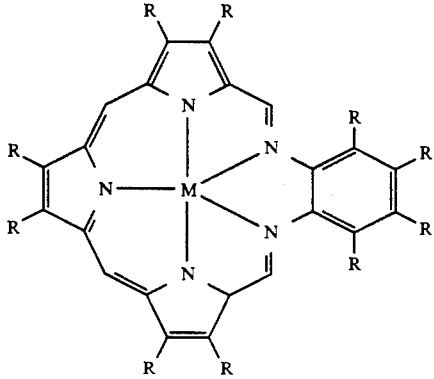
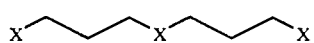
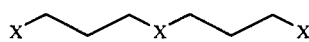
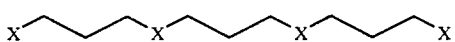
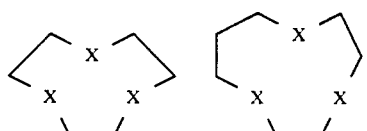
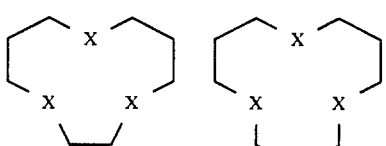

Wherein X is O, S, N, R or PR; R is hydrogen, an alkyl, aryl silyl, halogen, alkoxy, carboxylate, phosphate, or nitrogen containing moiety; R' is an alkyl or ether linkage; any terminal X is OR, SR, $NR_2$, or $PR_2$; any non-terminal X is O, S, NR or PR; and M is any transition metal, rare earth element, alkali or alkaline earth metal.

In terms of the metal ion, while it is believed that any transition metal, rare earth element, alkali or alkaline earth metal may be employed, the preferred metal ions will generally include $Co^{2+}$, $Fe^{2+}$, $Ni^{2+}$, $Cu^{2+}$, $Mn^{2+}$, $Pd^{2+}$ or $Gd^{3+}$ ion.

In the practice of the present invention, faujasite X and Y type zeolites are typically synthesized from solutions which include an alumina and silica source and water, together with an alkali metal hydroxide such as sodium hydroxide, admixed together with one of the foregoing metal complex. The starting material may be of any suitable source that will provide the aluminum and silicon oxides such as aluminum alkoxides, alumina, aluminates, silicates, silica gel and silicic acid. Typically, X and Y zeolites may be prepared over the range of respective molar ratios of $Al_2O_3/Na_2O/SiO_2/H_2O$ of 1/3–10/2–20/100–320. Even more preferred ranges of respective molar ratios will be on the order of 1/3/3.5/138. The selected metal chelate is typically incorporated at molar ratios of on the order of 0.001 to 0.05, relative to $Al_2O_3$.

For the preparation of A type faujasite zeolites the ratio is typically 1/1/2–5/35–200, and more preferably 1/2/2/35.

Once the reaction admixture is prepared, it is maintained at a temperature of from about 20° to 175° C., for a period of time of between about 2 and 144 hours or until crystallization is complete. A more preferred temperature range is from about 80 to about 90° C. for a period of time of between about 10 and about 20 hours.

For the preparation of faujasite-group zeolites, the alkali metal hydroxide is included in order to adjust pH and provide charge balance cations. Due to its inclusion, the resultant admixture will typically have a pH of between about 11 to 14.

The aluminum phosphate molecular sieves, like zeolites, are prepared hydrothermally at temperatures ranging from about 125° to 200° C. As noted above, these reactions are preferably carried out in an autoclave. The aluminum can be from a variety of sources including, for example, psuedoboehmite, alumina, and aluminum alkoxides. The phosphorous is generally added as phosphoric acid which can be prepared by dissolving $P_2O_5$ in water. The $Al_2O_3/P_2O_5$ molar ratio is most preferably about 1/1. Because of the acid, the initial aluminum phosphate gels may have a pH of about 3. This pH generally increases to a basic pH during crystallization. While the reaction time will generally decrease with an increasing temperature, it will typically vary from about 5 to 150 hours. The preferred aluminum phosphate molecular sieves for preparation in connection with the present invention are $AlPO_4$-5 molecular sieves, and their preparation is set forth in U.S. Pat. No. 4,310,440. Of course, in the practice of the present invention, one will incorporate the selected metal chelate directly into the reaction admixture prior to crystallization, allowing the corporation of the chelate into the interior of the molecular sieve.

While $AlPO_4$-5 molecular aluminum phosphate molecular sieves are preferred, the present invention contemplates the preparation of other types of aluminum phosphate molecular sieves such as AlPO-11, the preparation of which is also found in U.S. Pat. No. 4,310,440, as well as other aluminum phosphate molecular sieves such as VPI-5, $AlPO_4$-5 and $AlPO_4$-37 (see also Davis et al. (1989), Zeolites, Facts Figures, Future, Elsevier Amsterdam, 199, both incorporated herein by reference). Note that the aluminum phosphate molecular sieve may also contain silicon as exemplified by SAPO-37 and SAPO-42 as described in U.S. Pat. No. 4,440,871.

As noted, it is proposed that the molecular sieves of the present invention, particularly the zeolites, will find application in a wide range of embodiments, including application in adsorption and ion exchange chromatography, as catalysts and even as magnetic resonance imaging contrast agents. The ion exchange capacity of a molecular sieve is typically a function of the amount of aluminum that is in the framework structure. Each aluminum, being trivalent, requires neutralization of its net negative charge. This is usually accomplished by the use of cations of alkali or alkali earth metals in the synthesis formulation. These cations, present in their hydrated form, are loosely bonded to the framework aluminum resulting in a high degree of mobility. The mobility of the associated cations, therefore, provides for the ion exchange capacity.

Representative ion exchange techniques are disclosed in a wide variety of patents, including U.S. Pat. Nos. 3,140,249, 3,140,251, and 3,140,253, all incorporated herein by reference.

The ability of molecular sieves to separate materials by, for example, adsorption chromatography is typically a function of the pore size, the size of the intramolecular cage as well as electrostatic potential. Adsorbed molecules are retained within the intracrystalline channels. Access, however, is limited to molecules having effective diameters which are small enough to permit entry through the pores of the molecular sieve. Since the pores of the sieve will have a constant dimension from molecule to molecule, separation of a mixture of molecules based solely on molecular dimensions is possible.

Once the molecular sieve, whether it be an aluminum phosphate molecular sieve or faujasite-group zeolite, has been reacted and allowed to crystallize, it will be important to treat the crystalline material to remove impurities or unreacted materials. This is typically achieved by simply washing the crystals with an aqueous wash such as with deionized water. One may also choose to employ a solvent wash alone or in combination with the aqueous wash. A typical solvent which is employed for the washing of molecular sieve crystals is pyridine. However, other solvents may be employed where desired, such as acetone, methylene chloride or dimethylformamide, and the like.

Additionally, sublimation may be employed to remove volatile and other adsorbed impurities from the surface of the molecular sieve crystals such as non-encapsulated metal complexes. Sublimation involves placing the crystalline material under reduced pressure at elevated temperatures. This is typically achieved at pressures below 1 torr and temperatures greater than 300° C. Sublimation is the preferred method for removing surface complexes in that the solvent extraction is typically inefficient in removing such impurities.

A directing agent modifies the initial gel or acts as a template in the formation of the crystalline structure, the exact mechanism of this action is unclear. Many zeolites including FAU can be prepared in the absence of directing agents. On the other hand, aluminum phosphates generally require the presence of a template. The metal complexes may act as directing agents by also modifying the gel or acting as a template.

The following examples are intended to illustrate more preferred aspects of the present invention. It should be appreciated by those of skill in the art that the following examples are intended to reflect preferred applications of the present invention, and are in no way intended to limit the scope hereof. Those of skill in the art, in light of the present disclosure, will appreciate that many modifications, variations and alternatives may be employed without departing from the spirit and scope of the present invention.

EXAMPLE 1

1.12 grams of aluminum isopropoxide was mixed with 0.40 grams of sodium hydroxide in 1.5 mL of deionized water then heated with constant stirring at 80°-90° C. for 20 minutes. Simultaneously, 0.5 grams of silica gel was mixed with 0.4 grams of sodium hydroxide in 1.0 mL of deionized water and swirled until dissolved. The aluminate and silicate solutions were then combined with stirring in an additional 5 mL of water. 0.28 grams of 1,4,8,11-tetraazacyclotetradecane-copper(II) nitrate was added to the alumnosilicate gel with stirring. The entire mixture was placed in a sealed polypropylene bottle and heated at 95° C. for 17 hours. The resulting blue solid was washed with 200 mL of deionized water. Infrared spectroscopy and x-ray powder diffraction indicated a highly crystalline X type zeolite. Scanning electron microscopy indicated that the cubic crystals were ~10 microns in diameter.

EXAMPLE 2

4.65 grams of aluminum isopropoxide was mixed with 1.61 grams of sodium hydroxide in 6 mL of deionized water then heated with constant stirring at 80°-90° C. for ten minutes. Simultaneously, 2.14 grams of silica gel was mixed with 1.68 grams of sodium hydroxide in 4 mL of deionized water and swirled until dissolved. The aluminate and silicate solutions were then combined with stirring in an additional 18 mL of water. 0.043 grams of copper (II) phthalocyanine was added to the alumnosilicate gel with stirring. The entire mixture was placed in a sealed polypropylene bottle and heated at 90° C. for 11 hours. The resulting blue solid was washed with 500 mL of deionized water, then Soxhlet extracted with pyridine for 12 hours. After complex containing zeolite was then heated to 500° C. at <1 torr for 12 hours to remove surface species. Infrared spectroscopy and X-ray powder diffraction indicate a highly crystalline X type zeolite.

EXAMPLE 3

4.7 grams of aluminum isopropoxide was mixed with 1.65 grams of sodium hydroxide in 6 mL of deionized water then heated with constant stirring at 80°-90° C. for ten minutes. Simultaneously, 2.1 grams of silica gel was mixed with 1.6 grams of sodium hydroxide in 4 mL of deionized water and swirled until dissolved. The aluminate and silicate solutions were then combined with stirring in an additional 18 mL of water. 0.057 grams of copper (II) phthalocyanine dissolved in 2 mL of pyridine was added to the alumnosilicate gel with stirring. The entire mixture was placed in a sealed polypropylene bottle and heated at 90° C. for ten hours. The resulting blue solid was washed with 500 mL of deionized water, then Soxhlet extracted with pyridine for 12 hours. After complex containing zeolite was then heated to 500° C. at <1 torr for 12 hours to remove surface species. Infrared spectroscopy and X-ray powder diffraction indicated a highly crystalline X type zeolite.

EXAMPLE 4

5.1 grams of aluminum isopropoxide was hydrolyzed to produce fresh aluminum hydroxide which was then mixed with 1.0 grams of sodium hydroxide in 2 mL of deionized water then heated with constant stirring at 80°-90° C. for thirty minutes. Simultaneously, 1.5 grams of silica gel was mixed with 1.0 grams of sodium hydroxide in 4 mL of deionized water and swirled until dissolved. The aluminate and silicate solutions were then combined with stirring in an additional 2 mL of water. 0.08 grams of copper (II) phthalocyanine was added to the aluminosilicate gel with stirring. The entire mixture was placed in a sealed polypropylene bottle and heated at 80° C. for 16 hours. The resulting blue solid was washed with 150 mL of deionized water, then Soxhlet extracted with pyridine for 24 hours. After complex containing zeolite was then heated to 500° C. at <1 torr for 8 hours to remove surface species. Infrared spectroscopy and X-ray powder diffraction indicate a highly crystalline A type zeolite that contains 0.16% by wt of copper.

EXAMPLE 5

2.2 grams of aluminum isopropoxide was mixed with 0.8 grams of sodium hydroxide in 5 mL of deionized water then heated with constant stirring at 80°-90° C. for 30 minutes. 0.065 grams of bis(pyridyl)isoidolinecobalt(II) acetate was added to the aluminate gel with stirring. Simultaneously, 1.0 grams of silica gel was mixed with 0.8 grams of sodium hydroxide in 3 mL of deionized water and swirled until dissolved. The aluminate and silicate solutions were then combined with stirring in an additional 7 mL of water. The entire mixture was placed in a sealed polypropylene bottle and heated at 95° C. for 16 hours. The resulting pale green solid was washed with 150 mL of deionized water. Infrared spectroscopy and X-ray powder diffraction indicate a highly crystalline A type zeolite. Scanning electron microscopy indicate that the cubic crystals were ~5 microns in diameter.

EXAMPLE 6

2.23 grams of aluminum isopropoxide was mixed with 0.8 grams of sodium hydroxide in 5 mL of deionized water then heated with constant stirring at 80°-90° C. for 30 minutes. Simultaneously, 1.0 grams of silica gel was mixed with 0.8 grams of sodium hydroxide in 3 mL of deionized water and swirled until dissolved. The aluminate and silicate solutions were then combined with stirring in an additional 7 mL of water. 0.025 grams of bis(salicylaldehyde)ethylenediimine palladium(II) was added to the alumnosilicate gel with stirring. The entire mixture was placed in a sealed polypropylene bottle and heated at 90° C. for 24 hours. The resulting grey-brown solid was washed with 150 mL of deionized water. Infrared spectroscopy and X-ray powder diffraction indicated a highly crystalline X type zeolite.

EXAMPLE 7

4.1 grams of aluminum isopropoxide was hydrolyzed using 100 mL of deionized water and heated with constant stirring at 80°-90° C. for 30 minutes. The freshly prepared aluminum hydroxide was isolated and washed with copious amounts of water. Simultaneously, 1.4 grams of phosphorous pentoxide was dissolved in 5 mL of deionized water with stirring. The phosphoric acid and aluminum hydroxide were mixed and allowed to stand for 1 hours. 0.08 grams of copper(II)phthalocyanine was dissolved in 1.4 grams of tripropylamine then added to the aluminum phosphate solution. The entire mixture was aged at 25° C. for 1 hour then heated in an autoclave at 150° C. for 24 hours. The resulting crystals were washed with water, pyridine and acetone. Then heated under a vacuum at 480° C. for 8 hours. Infrared spectroscopy and X-ray powder diffraction indicate a highly crystalline AlPO-5 type molecular sieve. Scanning electron microscopy indicated that the hexagonal crystals were ~30 microns in diameter.

EXAMPLE 8

2.0 grams of silica gel and 0.04 grams of nickel (II) phthalocyanine was mixed with 1.6 grams of sodium hydroxide in 4 mL of deionized water and stirred for 30 minutes. Then 4.5 grams of aluminum isopropoxide was mixed with 1.6 grams of sodium hydroxide in 6 mL of deionized water then heated with intermittent stirring at 80°-90° C. for 15 minutes. The aluminate and silicate solutions were then combined with stirring in an additional 18 mL of deionized water. The mixture was placed in polypropylene bottle, sealed, stirred for 24 hours and then heated at 95° C. for 8 hours. The resulting blue-green solid was washed with 1200 mL of deionized water then extracted with pyridine for 15 hours. The zeolite was then heated at 510° C. for 48 hours under a vacuum to remove surface species. Infrared spectroscopy and x-ray powder diffration indicate a highly crystalline X type zeolite containing NiPc.

PROPHETIC EXAMPLE 9

4.1 grams of aluminum isopropoxide can be hydrolyzed using 100 mL of deionized water and heated with constant stirring at 80°-90° C. for 30 minutes. The freshly prepared aluminum hydroxide can be isolated and washed with copious amounts of water. Simultaneously, 1.4 grams of phosphorous pentoxide can be dissolved in 8 mL of water with stirring. The phosphoric acid and aluminum hydroxide can be mixed and stirred for 1.5 hours at room temperature. 0.10 grams of the expanded porphyrin 4,5,9,24-tetraethyl-10,23-dimethyl-13,20,25,26,27-pentaazapentacyclo [20.2.1.1$^{3,6}$,1$^{8,11}$,0$^{14,19}$]heptacosa-1,3,5,7,9,11,(27)12,14,16,18,20,22,(25),23-tridacaene gadolinium(III) hydroxide can be mixed with 1.0 grams of dipropylamine and stirred for 1 hour. The mixture can then be heated in an autoclave at 140° C. for 24 hours. The resulting VPI-5 molecular sieve containing the expanded porphyrin complex can be washed with water, dried and characterized by IR and XRD.

While the compositions and methods of this invention have been described in terms of preferred embodiments, it will be apparent to those of skill in the art that variations may be applied to the composition, methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A process for the preparation of zeolites of the faujasite group which includes an encapsulated multidentate metal chelate complex, the process comprising the steps of:
   preparing an aqueous alkaline admixture of aluminate and silicate anions and an alkaline or alkaline earth hydroxide, in molar ratios and a pH appropriate for the formation of a zeolite of the faujasite group;
   introducing a multidentate metal chelate complex larger than nominal pore size of the faujasite zeolite into the admixture;
   reacting the admixture under conditions appropriate for the formation of a crystalline zeolite of the faujasite group; and
   preparing from the reacted admixture a crystalline zeolite having the multidentate metal complex encapsulated within the zeolite.

2. The process of claim 1, wherein the zeolite comprises an FAU or LTA type zeolite.

3. The process of claim 2, wherein the zeolite comprises and FAU type zeolite.

4. The process of claim 1, wherein the crystalline zeolite is at least 80% crystalline.

5. The process of claim 4, wherein the crystalline zeolite is about 100% crystalline.

6. The process of claim 1, wherein the aqueous alkaline admixture has a pH of from about 11 to 14.

7. The process of claim 1, wherein the aqueous alkaline admixture comprises a molar ratio of aluminate/silicate/water in a range of about 1/1-10/17-100, respectively.

8. The process of claim 7, wherein an FAU type zeolite is prepared and the aqueous alkaline admixture comprises a molar ratio of aluminate/silicate/water in a range of about 1/1-10/50-160, respectively.

9. The process of claim 8, wherein the admixture is reacted at between about 20 and 175 degrees C., for between about 2 and 144 hours.

10. The process of claim 9, wherein the admixture is reacted until crystallization is essentially complete.

11. The process of claim 7, wherein an LTA type zeolite is prepared and the aqueous alkaline admixture comprises a molar ratio of aluminate/silicate/water in a range of about 1/1-3/17-100, respectively.

12. The process of claim 11, wherein the admixture is reacted at between about 20 and 175 degrees C., for between about 2 and 144 hours.

13. The process of claim 12, wherein the admixture is reacted until crystallization is essentially complete.

14. The process of claim 1, wherein the prepared crystalline zeolite is at least 80% pure.

15. The process of claim 14, wherein the prepared crystalline zeolite is essentially pure.

16. A faujasite zeolite encapsulating a homogeneously distributed multidentate metal chelate prepared by the process of claim 1.

17. A process for the preparation of a crystalline aluminum phosphate molecular sieve which includes an encapsulated multidentate metal chelate complex, the process comprising the steps of:
   a) preparing an aqueous acidic admixture of aluminate and phosphate anions in molar ratios appropriate for the formation of an aluminum phosphate molecular sieve;
   b) introducing a multidentate metal chelate complex larger than nominal pore size of the crystalline aluminophosphate molecular sieve into the admixture;
   c) reacting the admixture under conditions appropriate for the formation of an aluminum phosphate molecular sieve; and
   d) preparing from the reacted admixture the molecular sieve having the multidentate metal chelate complex encapsulated within the molecular sieve.

18. The process of claim 17, wherein the aluminate is introduced in the form of an aluminum alkoxide.

19. The process of claim 17, wherein the phosphorus is introduced in the form of phosphoric acid.

20. The process of claim 17, wherein the molecular sieve is at least 80% crystalline.

21. The process of claim 20, wherein the molecular sieve is about 100% crystalline.

22. The process of claim 17, further comprising incorporating a directing agent into the admixture prior to reacting.

23. The process of claim 22, wherein the directing agent comprises an alkyl ammonium salt or a neutral amine.

24. The process of claim 17, wherein the aqueous admixture comprises a molar ratio of aluminate/phosphorous in a range of about 1/1.

25. The process of claim 24, wherein the admixture is reacted at between about 125 and 200 degrees C., for between about 5 and 150 hours.

26. The process of claim 25, wherein the admixture is reacted until crystallization is essentially complete.

27. The process of claim 1 or 17, wherein the multidentate chelate ligand of the multidentate metal chelate complex comprises a polyazo, polyphosphoro, polysulfur, polyether macrocycle, or a heteronuclear chelate macrocycle comprising one or more of the foregoing groups.

28. The process of claim 27, wherein the multidentate chelate ligand comprises a polyazo macrocycle.

29. The process of claim 28, wherein the polyazo macrocycle comprises a tetraazo macrocycle.

30. The process of claim 27, wherein the multidentate metal chelate complex comprises one of the following compounds:

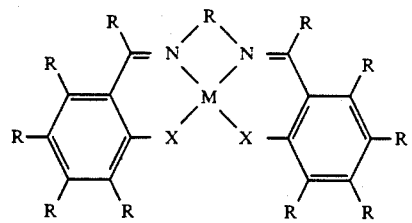

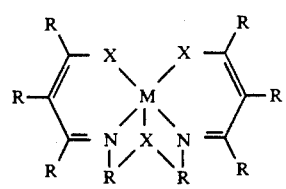

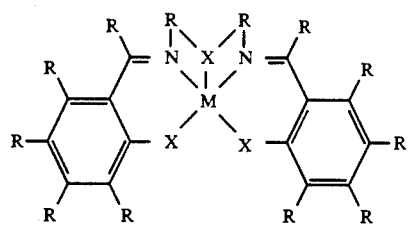

wherein X is O, S, NR or PR; R is hydrogen, an alkyl, aryl, silyl, halogen, alkoxy, carboxylate, phosphate, or nitrogen containing moiety; and M is any transition metal, rare earth element, alkali or alkaline earth metal.

31. The process of claim 27, wherein the multidentate chelate of the multidentate metal chelate complex comprises one of the following compounds:

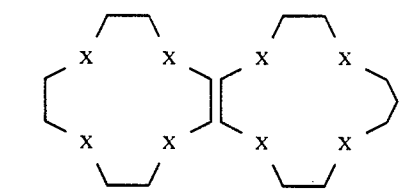

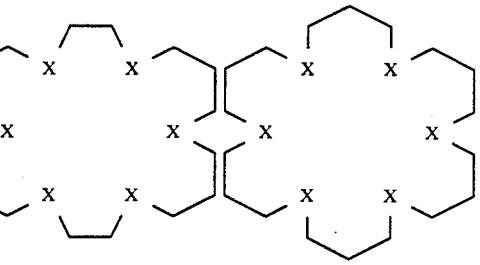

wherein X is O, S, NR or PR; R is hydrogen, an alkyl, aryl, silyl, halogen, alkoxy, carboxylate, phosphate, or nitrogen containing moiety.

32. The process of claim 27, wherein the multidentate metal chelate complex comprises one of the following compounds:

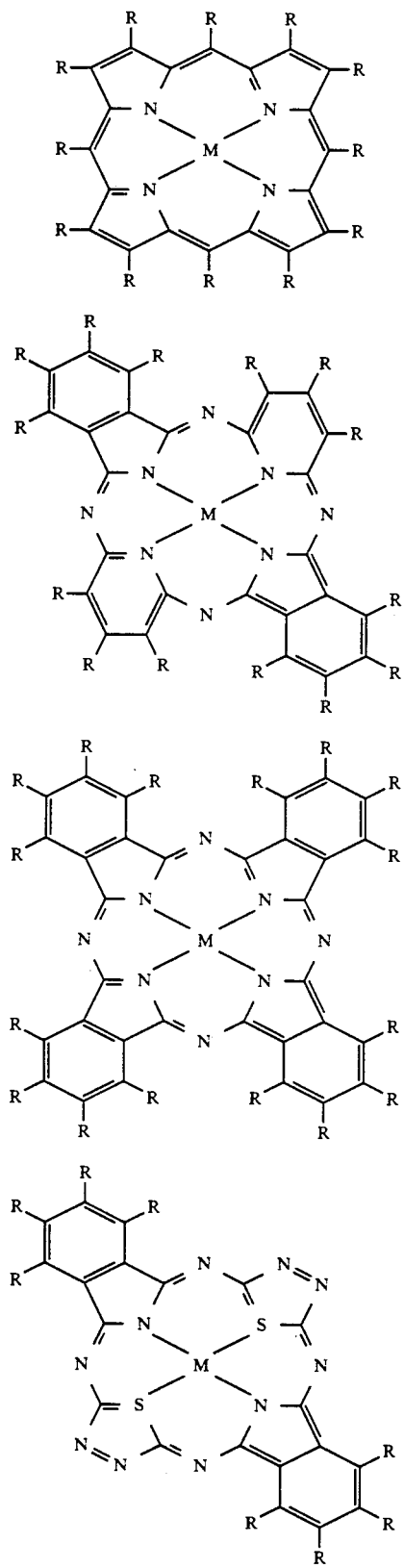
wherein R is hydrogen, an alkyl, aryl, silyl, halogen, alkoxy, carboxylate, phosphate, or nitrogen containing moiety; and M is any transition metal, rare earth element, alkali or alkaline earth metal.
33. The process of claim 27, wherein the multidentate metal chelate complex comprises one of the following compounds:
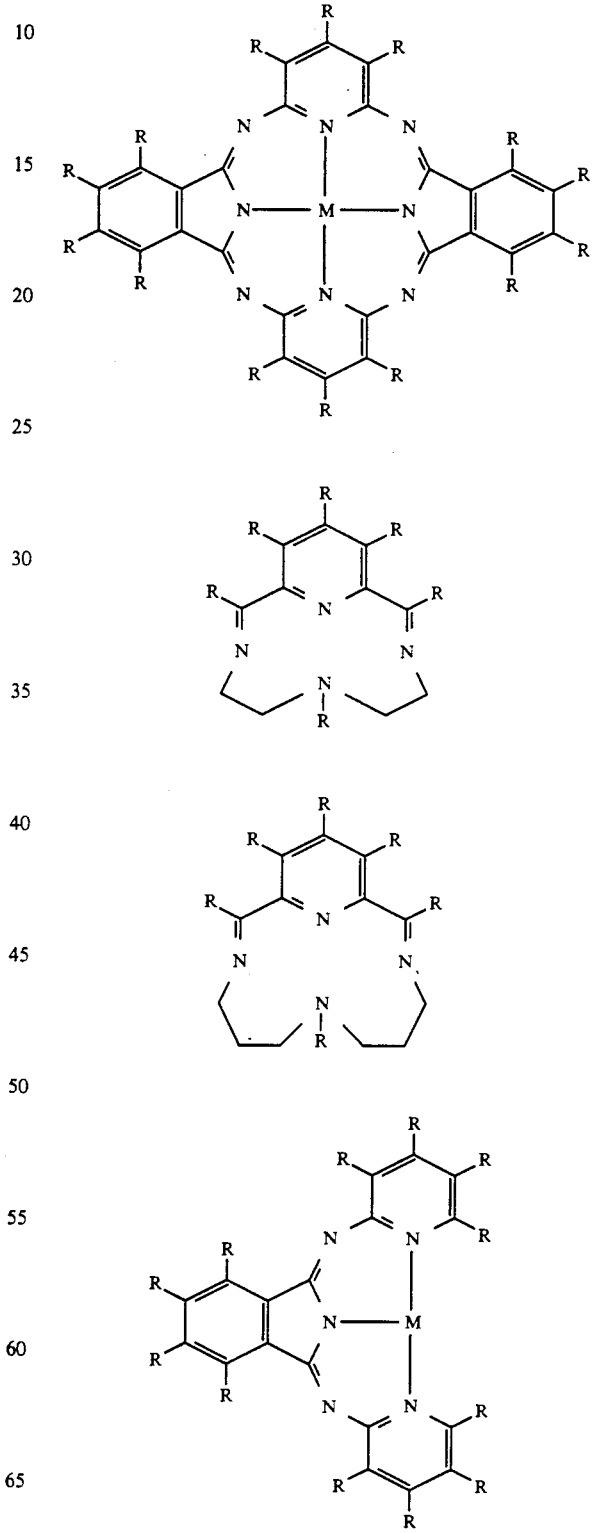

-continued

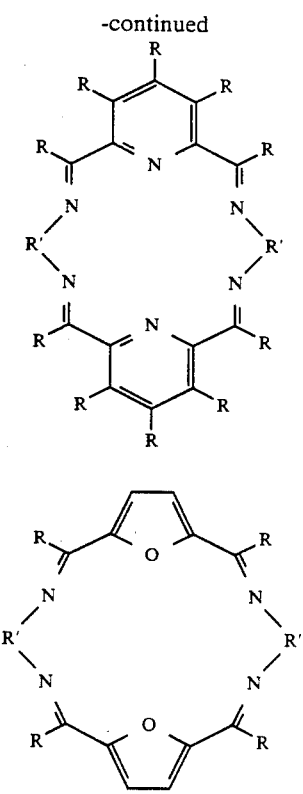

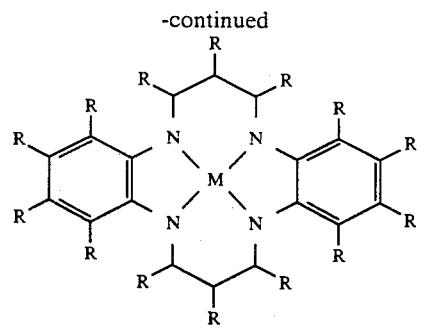

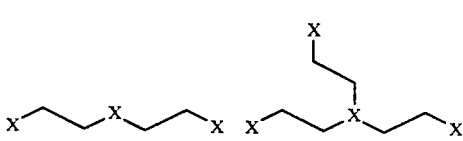

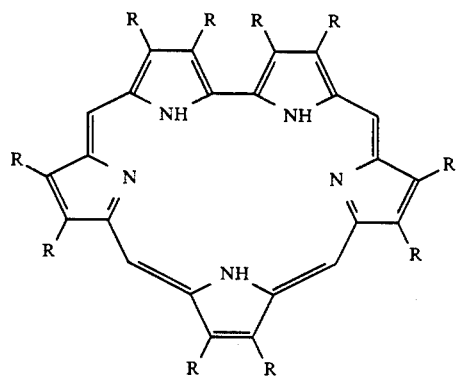

wherein R is hydrogen, an alkyl, aryl, silyl, halogen, alkoxy, carboxylate, phosphate, or nitrogen containing moiety; R' is an alkyl or ether linkage; and M is any transition metal, rare earth element, alkali or alkaline earth metal.

34. The process of claim 27, wherein the multidentate metal chelate complex comprises one of the following compounds:

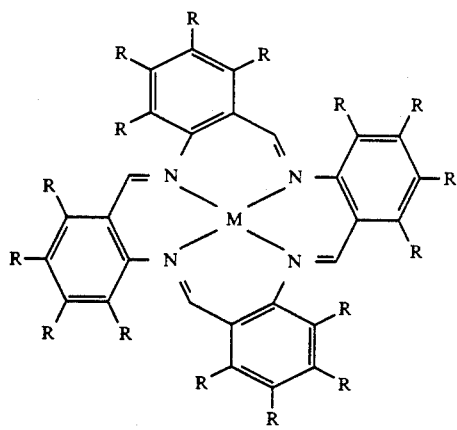

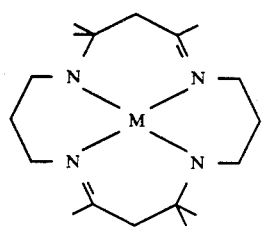

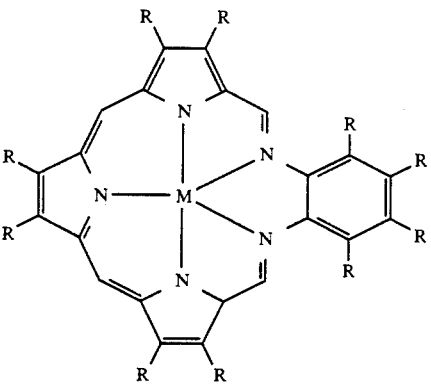

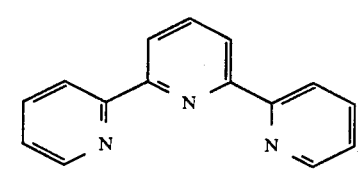

wherein R is hydrogen, an alkyl, aryl, silyl, halogen, alkoxy, carboxylate, phosphate, or nitrogen containing moiety; a terminal X is OR, SR, NR$_2$, or PR$_2$; a nonterminal X is O, S, NR or PR; and M is any transition metal, rare earth element, alkali or alkaline earth metal.

35. The process of claim 27, wherein the metal ion of the multidentate metal chelate complex comprises a transition metal, rare earth element, alkali or alkaline earth metal.

36. The process of claim 35, wherein the metal ion comprises a $Co^{2+}$, $Fe^{2+}$, $Ni^{2+}$, $Cu^{2+}$, $Mn^{2+}$, $Pd^{2+}$ or $Gd^{3+}$ ion.

37. The process of claim 1 or 17, wherein step (d) comprises treating the admixture to remove impurities or unreacted materials.

38. The process of claim 37, wherein the reacted admixture is treated by washing with an aqueous wash.

39. The process of claim 37, wherein the reacted admixture is washed with a selected solvent.

40. The process of claim 39, wherein the solvent is pyridine.

41. The process of claim 37, wherein the reacted admixture is treated by sublimation.

42. The process of claim 17, wherein the prepared molecular sieve is at least 80% pure.

43. The process of claim 42, wherein the prepared molecular sieve is essentially pure.

44. A molecular sieve prepared by the process of claim 17.

* * * * *

UNITED STATES PATENT AND TRADEMARK OFFICE
CERTIFICATE OF CORRECTION

PATENT NO. : 5,167,942
DATED : December 1, 1992
INVENTOR(S) : Kenneth J. Balkus, et al It is certified that error appears in the above-indentified patent and that said Letters Patent is hereby corrected as shown below:

On the title page, item (75): Inventors, delete "Kenneth J. Balkus" and insert --Kenneth J. Balkus, Jr.--.

In Claim 25, Line 17, Column 21, after C, delete --.--

In column 7, last line, delete --X-- and insert "FAU".

In column 15, Line 55, delete --$AlPO_4$-5-- and insert "$AlPO_4$-8".

In column 1, line 10, delete --LTH-- and insert "LTA".

In column 1, line 49, delete --X, Y and.-- and insert "X, Y and A."

In column 6, line 66, delete --AlPO-5, AlPO-11-- and insert "$AlPO_4$-5, $AlPO_4$-11".

In column 6, line 67, delete --AlPO-5-- and insert "$AlPO_4$-5"

In column 7, line 14, delete --AlPO-5-- and insert "$AlPO_4$-5".

In column 7, line 44, delete --patter-- and insert "pattern".

UNITED STATES PATENT AND TRADEMARK OFFICE
CERTIFICATE OF CORRECTION

PATENT NO. : 5,167,942

DATED : December 1, 1992

INVENTOR(S) : Kenneth J. Balkus, et al.

It is certified that error appears in the above-indentified patent and that said Letters Patent is hereby corrected as shown below:

Column 15, line 52, delete "AlPO-11" and insert --$AlPO_4$-11--.

Signed and Sealed this

Fifth Day of April, 1994

BRUCE LEHMAN

Attest:

Attesting Officer

Commissioner of Patents and Trademarks